(12) United States Patent
Petrone

(10) Patent No.: US 6,949,191 B1
(45) Date of Patent: Sep. 27, 2005

(54) PACKAGED WASTEWATER TREATMENT UNIT

(75) Inventor: Richard J. Petrone, Erie, PA (US)

(73) Assignee: JRJ Holdings, LLC, Washington, IL (US)

( * ) Notice: Subject to any disclaimer, the term of this patent is extended or adjusted under 35 U.S.C. 154(b) by 0 days.

(21) Appl. No.: 10/835,805

(22) Filed: Apr. 29, 2004

(51) Int. Cl.[7] .................................................. C02F 3/08
(52) U.S. Cl. .................. 210/619; 210/151; 210/195.3; 210/261; 210/262
(58) Field of Search .............................. 210/616, 617, 210/619, 150, 151, 195.3, 257.1, 261, 262, 210/258, 259

(56) References Cited

U.S. PATENT DOCUMENTS

| | | | |
|---|---|---|---|
| 2,553,228 A | * 5/1951 | Yonner | 210/261 |
| 3,389,798 A | 6/1968 | Hartmann et al. | |
| 3,494,463 A | * 2/1970 | Vermette | 210/151 |
| 3,540,589 A | 11/1970 | Boris | |
| 3,732,160 A | * 5/1973 | Klock | 210/617 |
| 3,914,351 A | 10/1975 | McKeown et al. | |
| 3,966,599 A | 6/1976 | Burkhead | |
| 3,966,604 A | 6/1976 | Diggs | |
| 3,966,608 A | 6/1976 | Mason et al. | |
| 3,985,653 A | 10/1976 | Ahlgren | |
| 4,028,244 A | 6/1977 | Holmberg | |
| 4,035,290 A | * 7/1977 | Torpey | 210/619 |
| 4,089,782 A | 5/1978 | Huebner | |
| 4,137,172 A | 1/1979 | Sako et al. | |
| 4,160,736 A | 7/1979 | Prosser | |
| 4,200,532 A | 4/1980 | Iwatani et al. | |
| 4,229,202 A | 10/1980 | Mullerheim et al. | |
| 4,333,893 A | 6/1982 | Clyde | |
| 4,468,326 A | 8/1984 | Kawert | |
| 4,540,491 A | 9/1985 | Zimmer | |
| 4,650,577 A | 3/1987 | Hansel | |
| 4,668,387 A | 5/1987 | Davie et al. | |
| 4,687,574 A | 8/1987 | Hellman | |
| 4,729,828 A | 3/1988 | Miller | |

(Continued)

FOREIGN PATENT DOCUMENTS

| | | |
|---|---|---|
| CH | NR. 193633 | 10/1937 |
| JP | 54-12146 | 1/1979 |
| SU | 1423503 A1 | 9/1988 |

OTHER PUBLICATIONS

Jet Inc. Owner's Manual—1500 Series BAT Media Plants, Feb. 2003.

*Primary Examiner*—Christopher Upton
(74) *Attorney, Agent, or Firm*—Brinks Hofer Gilson & Lione; Marc V. Richards; Stephanie J. Felicetty

(57) ABSTRACT

A packaged wastewater treatment unit has a compact configuration into which all subcomponents may be integrally molded. The compactness of the unit results from the arrangement of the subcomponents within the unit. In one embodiment, a clarifying unit and a basin into which a biological digester is mounted are formed within the top surface of a tank. The interior of the tank contains a collecting compartment separated from a secondary compartment by a baffle. In another embodiment, the housing of a disinfecting unit, such as an ultraviolet or chlorination unit, is also formed within the top surface of the packaged system.

A method for treating wastewater includes using a single integrated unit to feed an effluent stream to a collection tank and then transport it to a biological digester, clarifying unit, and disinfecting unit. The effluent stream may be transported through the unit by a series of pumps and spillways. Optionally, the output stream may also be subjected to a sand filtration unit.

19 Claims, 6 Drawing Sheets

U.S. PATENT DOCUMENTS

| | | | |
|---|---|---|---|
| 4,737,278 A | | 4/1988 | Miller |
| 4,895,645 A | * | 1/1990 | Zorich, Jr. .................. 210/261 |
| 5,221,470 A | | 6/1993 | McKinney |
| 5,240,597 A | | 8/1993 | Ueda |
| 5,290,435 A | * | 3/1994 | Stilkenboom ............... 210/619 |
| 5,322,621 A | * | 6/1994 | Fan et al. ................... 210/151 |
| 5,350,507 A | | 9/1994 | McManus |
| 5,352,357 A | * | 10/1994 | Perry ......................... 210/261 |
| 5,395,529 A | * | 3/1995 | Butler ........................ 210/262 |
| 5,401,398 A | | 3/1995 | McManus |
| 5,453,182 A | * | 9/1995 | Kikuta ....................... 210/151 |
| 5,766,454 A | | 6/1998 | Cox et al. |
| 5,788,836 A | | 8/1998 | Davis |
| 5,853,591 A | * | 12/1998 | Snyder et al. .............. 210/619 |
| 6,126,816 A | | 10/2000 | Ruiz, Jr. |
| 6,224,752 B1 | | 5/2001 | Drewery |
| 6,554,996 B1 | | 4/2003 | Rebori |
| 6,572,774 B2 | | 6/2003 | Ricketts |
| 6,585,886 B1 | | 7/2003 | Luehr |
| 2003/0136716 A1 | | 7/2003 | Moffitt et al. |

\* cited by examiner

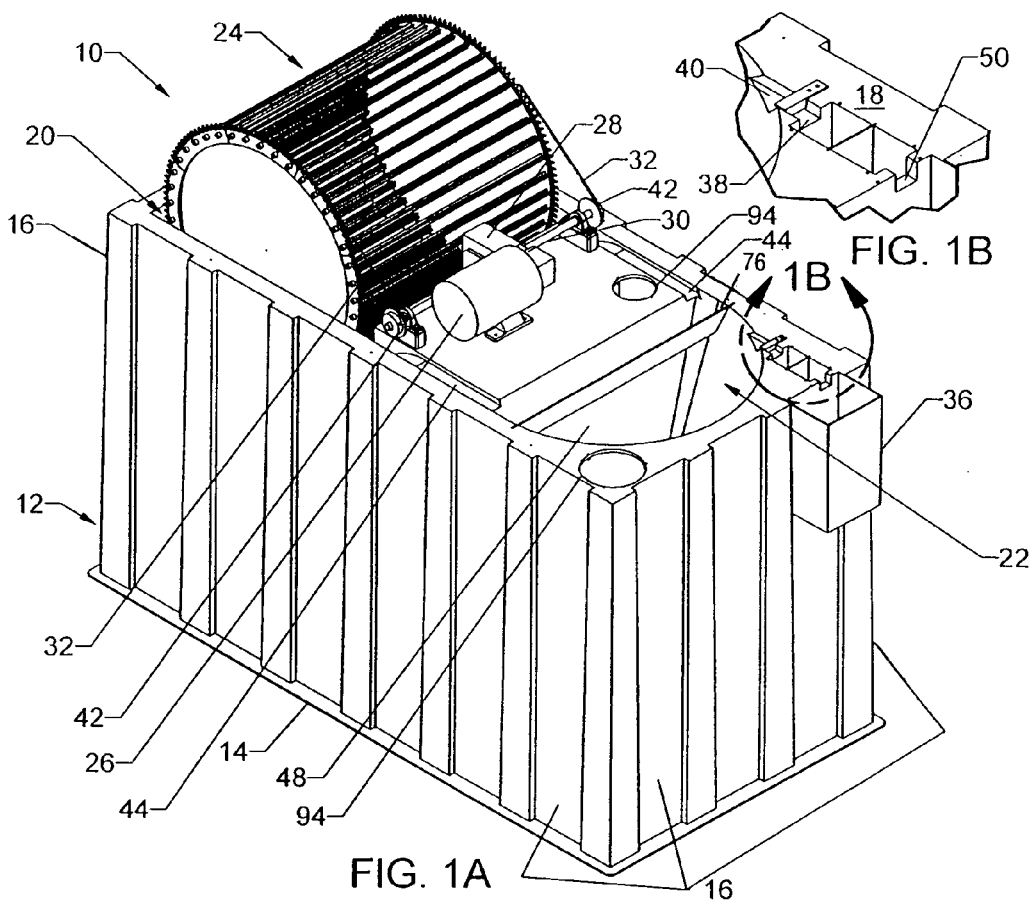
FIG. 1A
FIG. 1B
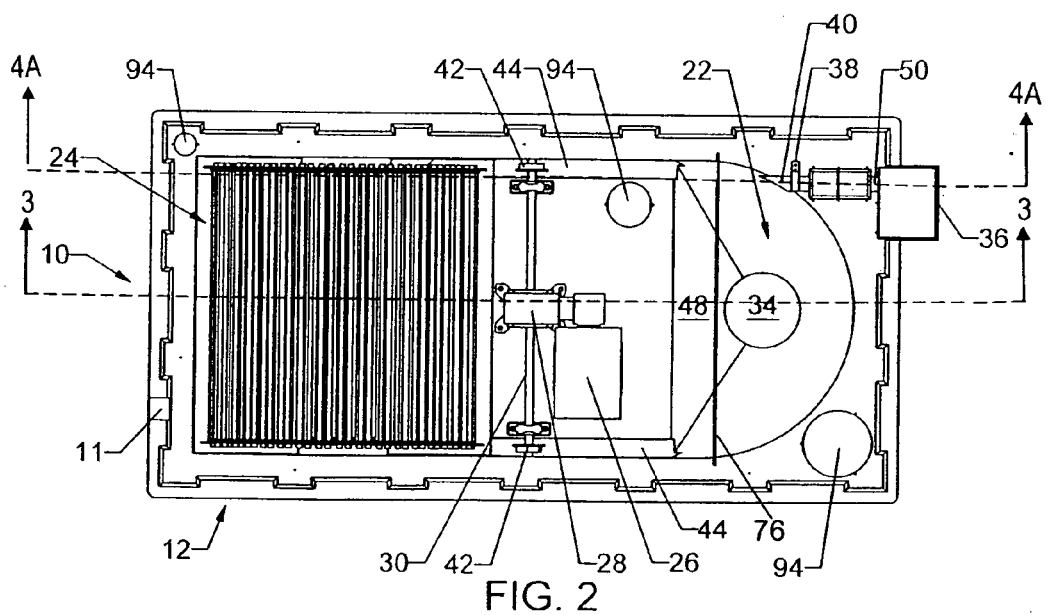
FIG. 2

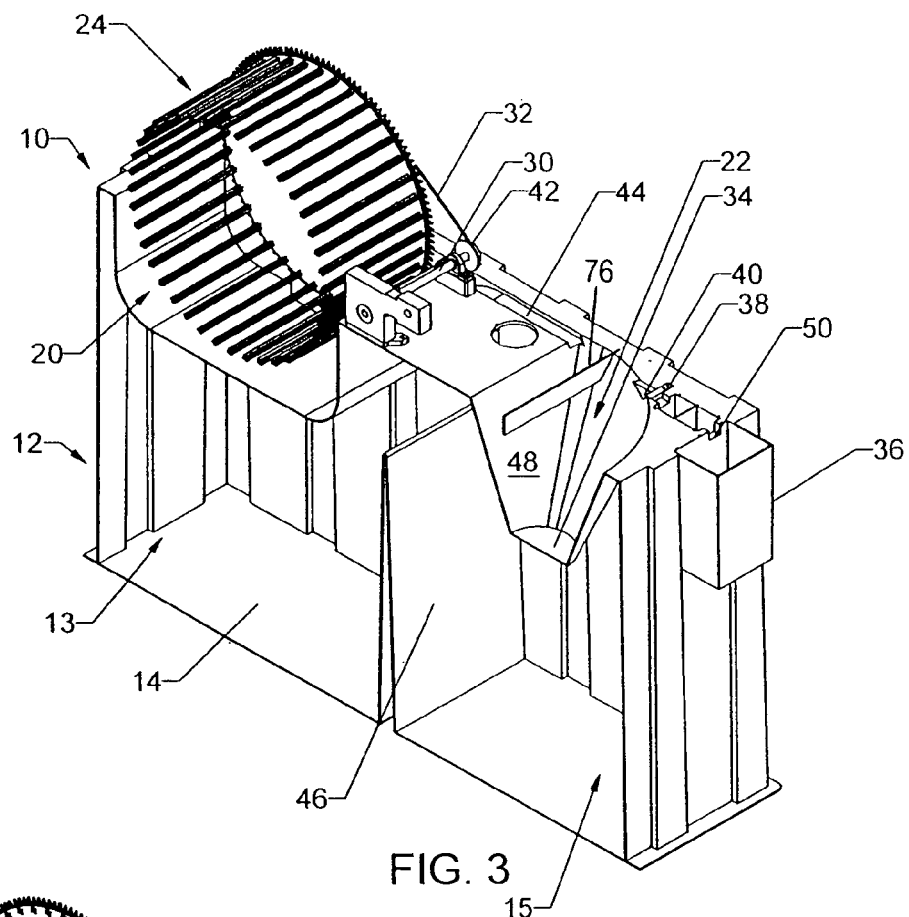
FIG. 3
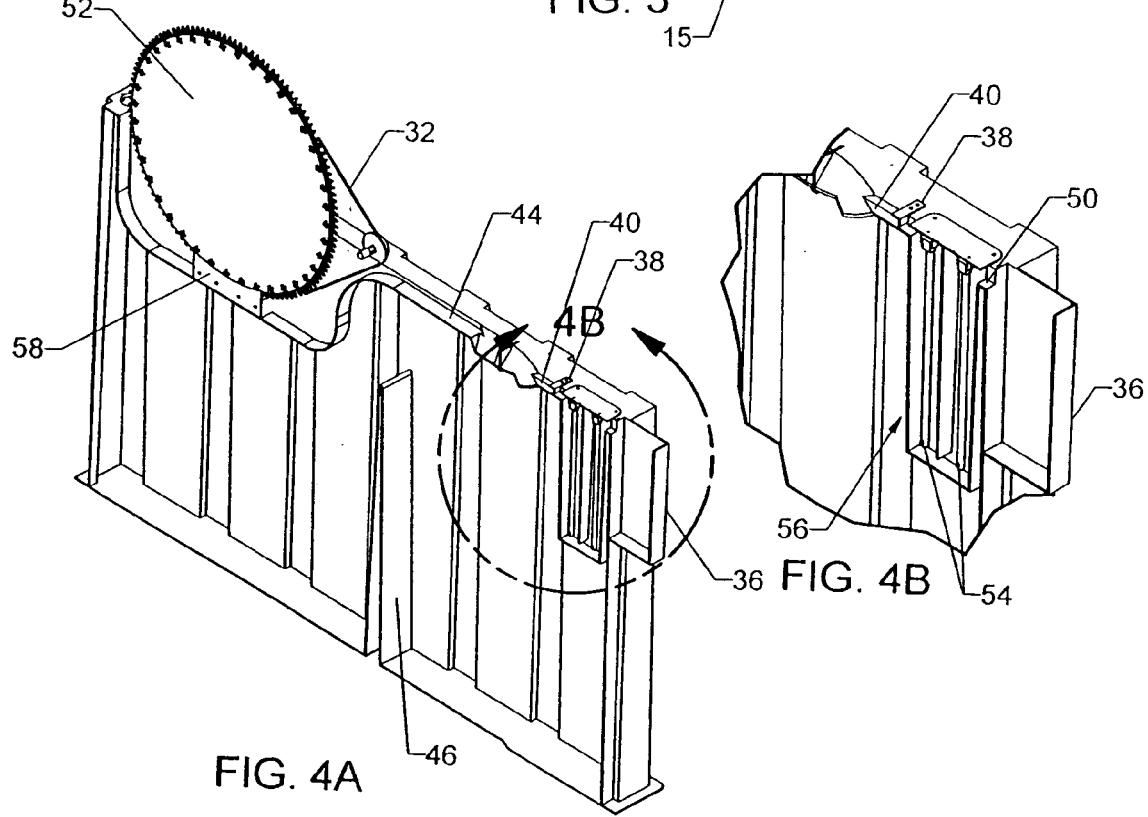
FIG. 4A
FIG. 4B

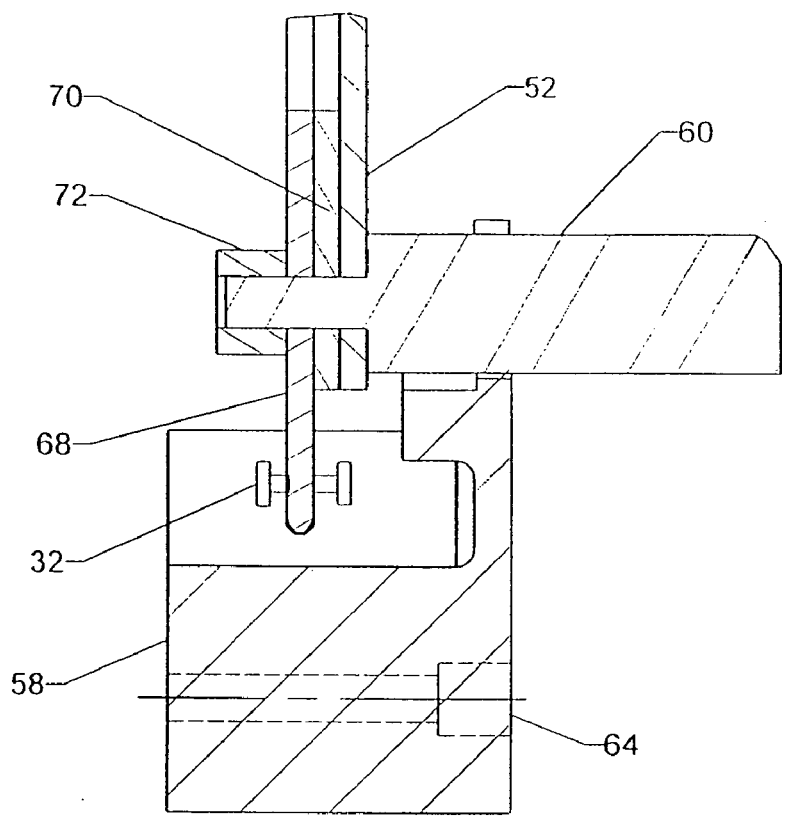
FIG. 6
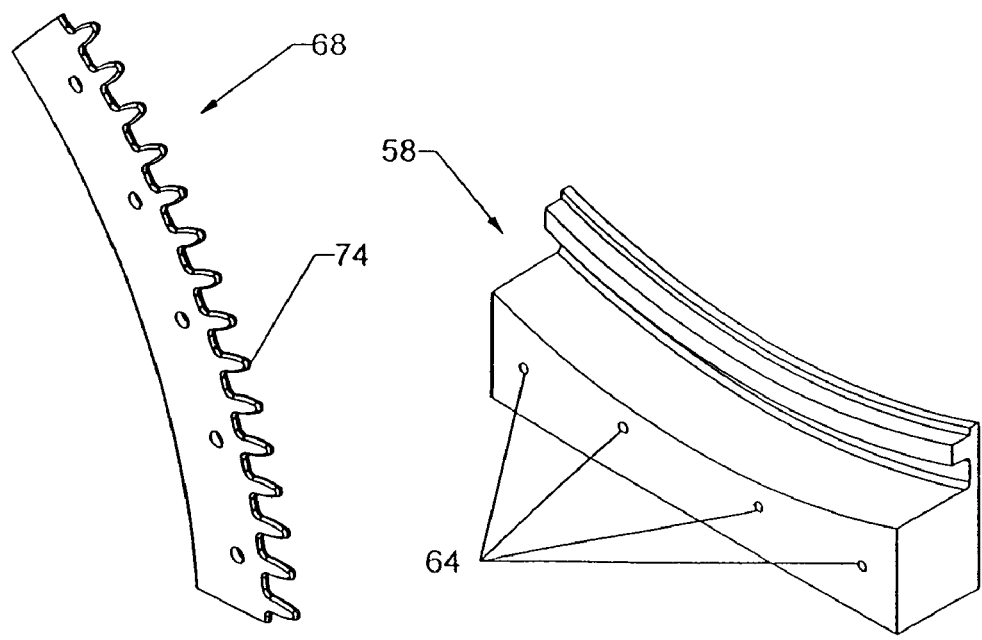
FIG. 7
FIG. 8

PACKAGED WASTEWATER TREATMENT UNIT

BACKGROUND

1. Technical Field

The present invention relates to wastewater treatment systems.

2. Background Information

To meet local health and water regulations in areas where no municipal waste treatment hook-ups are available, household wastewater treatment systems should be capable of converting a stream of wastewater into a condition suitable for discharge into the surrounding ecosystem. However, there are regions where soil conditions do not permit the use of conventional septic systems.

Alternatives to septic systems are available that can treat wastewater to a quality suitable for above-ground discharge. However, due to their size, cost and complexity, these systems typically require custom-solution engineering and as such are predominantly used for industrial wastewater treatment. These systems may contain a number of optional components, including components to stage the waste stream, meter the flow into a digester, digest the impurities, clarify the effluent, and ultimately disinfect the output stream, depending on the treated water quality to be obtained.

One type of digester that may be used in such a wastewater treatment system is a rotating biological contactor (RBC). An RBC may be a stack of parallel plates on a rotating shaft or may be a rotating enclosure containing a plurality of media onto which aerobic bacteria can attach. Examples of RBCs are disclosed in U.S. Pat. No. 5,350,507 to McManus; U.S. Pat. No. 4,137,172 to Sako et al.; U.S. Pat. No. 4,200,532 to Iwatani et al.; and U.S. Pat. No. 4,333,893 to Clyde. Examples of such media are disclosed in U.S. Pat. No. 5,401,398, to McManus. The above references are hereby incorporated herein by reference. RBCs host aerobic bacteria and provide those bacteria with a continual supply of all life-supporting ingredients by exposing them to effluent, their source of food, and air, their source of oxygen. These bacteria may then be used to digest impurities in a stream of wastewater.

These prior wastewater treatment systems have several disadvantages. First, they consist of several individual components that must be separately transported, installed and maintained. Second, they consume a large amount of space, causing the systems to be unwieldy to transport and to require a substantial amount of labor to install. Third, such systems typically are not available for household use. Although prior wastewater treatment systems may include a combination of known components for treating wastewater (see e.g., U.S. Pat. No. 4,687,574 to Hellman), these systems do not provide a compact, one-piece unit that houses all the components necessary to efficiently convert a household wastewater stream into an effluent that is suitable for above-ground discharge. Thus, there is a need for a compact, efficient wastewater treatment system for household wastewater.

SUMMARY

The present invention is intended to meet the above-mentioned needs. In one embodiment of the present invention, a wastewater treatment system includes a tank having a bottom, side walls, and a top, the top having a first and second basin therein; a generally cylindrical enclosure adapted for containing a plurality of bacteria-hosting media, the enclosure rotatably mounted partially within the first basin; and means for destroying microscopic organisms in a stream of effluent from the second basin.

In a second embodiment of the present invention, a wastewater treatment system includes a closed tank divided into two interior compartments—a collecting compartment and a compartment that receives liquid overflow from the collecting compartment. The top surface or lid of the closed tank includes two basins formed therein. The first basin receives a rotating biological digester enclosing bacteria-hosting media, and the second basin is a clarifying unit. Preferably, a third basin, configured for receiving a disinfecting unit, is also formed in the top surface of the tank. An effluent stream may be transported through the system by a series of pumps, overflow weirs and spillways. After exiting the system, the final effluent may optionally be subjected to a sand filtration unit or a distribution pump.

Another aspect of the invention involves a method for treating wastewater. The method includes providing an integrally molded monolithic enclosure having an interior and a top, the interior being adapted to form a collection tank and the top being molded to form a digesting basin and a clarifying chamber; feeding the wastewater to the collection tank to obtain a liquid first effluent; transporting the liquid first effluent to the digesting basin having a biological digester mounted therein to obtain a second effluent; transporting the second effluent to the clarifying chamber to obtain a third effluent; and transporting the third effluent to a disinfector to obtain a fourth effluent, wherein the disinfector comprises means for destroying microscopic organisms.

Additional features and advantages of the present invention will be apparent to one of ordinary skill in the art from the drawings and detailed description of the preferred embodiments below.

BRIEF DESCRIPTION OF THE DRAWINGS

FIG. 1A is a perspective view of one embodiment of the packaged wastewater treatment unit of the present invention.

FIG. 1B is a magnified top view of the disinfector unit and surrounding areas enclosed by circle 1B shown in FIG. 1A.

FIG. 2 is a top view of the unit shown in FIG. 1A.

FIG. 3 is a sectional view of the unit shown in FIG. 2, taken along line 3—3.

FIG. 4A is a sectional view of the unit shown in FIG. 2, taken along line 4A—4A.

FIG. 4B is a detailed sectional view of the unit in the area enclosed by circle 4B shown in FIG. 4A.

FIG. 6 depicts a detailed sectional view of a basket bearing, sprocket, and drive chain system.

FIG. 7 is a perspective view of a chain sprocket used in the system shown in FIG. 6.

FIG. 8 is a perspective view of a basket bearing used in the system shown in FIG. 6.

DETAILED DESCRIPTION OF PRESENTLY PREFERRED EMBODIMENTS

Figures 5A, 5B:
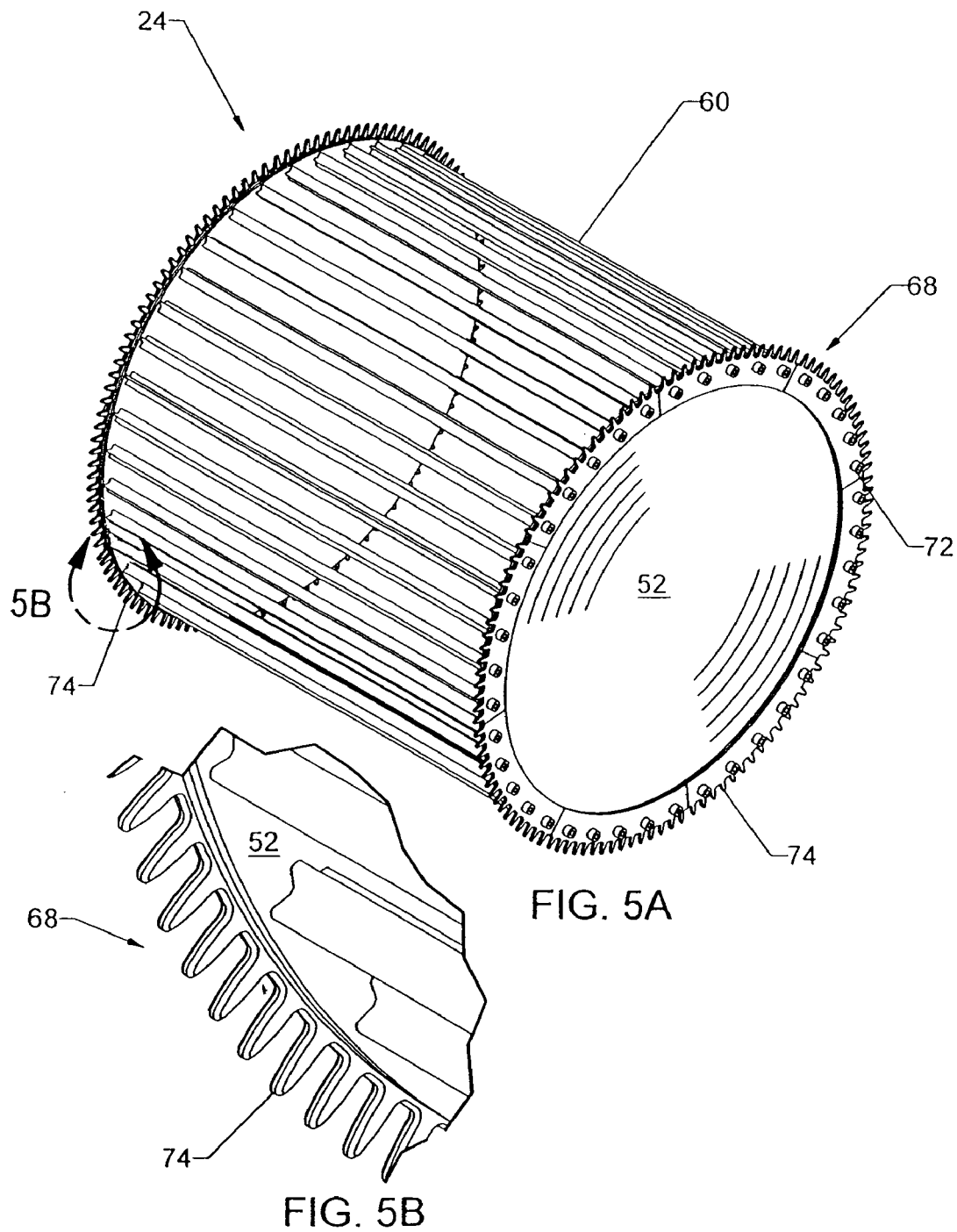
FIG. 5A is a perspective view of a rotating biological digester used in the embodiment of the invention shown in FIG. 1A.
FIG. 5B is a magnified view of the sprocket and end disc enclosed by circle 5B shown in FIG. 5A.

The present invention overcomes the disadvantages of existing wastewater treatment systems by providing a compact and efficient system. Preferably, the compartments, basins and chambers of the waste treatment system may be integrally molded as a single monolithic compact unit. The compactness of the unit results from the strategic arrangement of the components within the unit. With the use of appropriate media, such as those disclosed in commonly-owned, U.S. Pat. No. 6,852,227, to Richard J. Petrone, filed on the same date as the present application, which co-pending application is incorporated herein by reference, the resulting effluent may be compliant with the National Sanitation Foundation requirements for households and, therefore, may be installed as a household unit. In addition, the compactness of the unit facilitates transporting and installing the system in a confined household or residential environment, as well as in other settings.

Now with particular reference to the drawings, FIGS. 1A and 2 show one embodiment of the packaged wastewater treatment unit of the present invention. This embodiment of the packaged unit 10 contains a wastewater inlet 11 to a tank 12 having a bottom 14, four side walls 16, and a top 18. Preferably, the tank 12 is a sealed enclosure. Within the top 18 of the unit 10 is a first basin 20, in which a rotating digester 24 may be mounted, and a second basin 22 which serves as a clarifying unit. The top 18 also contains apertures 94 that serve as access panels to the tank interior. Covers may be placed on these apertures 94. The tank 12 may be installed underground to protect it against freezing, and a cover (not shown) may be positioned over the top 18 of the tank 12 and the digester 24 to protect them from the effects of the environment.

FIGS. 3, 4A, and 4B depict cut-away perspectives of the unit 10 and the system components shown in FIGS. 1A and 2. Upstanding from the bottom 14 of the tank 12 of this embodiment, is a vertical baffle 46, separating the tank 12 into two compartments—a collection tank 13, which is located beneath the digester basin 20, and a secondary tank 15, which is located beneath clarifier basin 22 and disinfector basin 56. The baffle 46, which may be integrally molded with the bottom 14 of the tank 12, assists in the holding back the solids in the incoming stream from the liquid. The collection tank 13 receives the effluent to be treated and serves as the sludge settlement and holding area. The presence of naturally-occurring anaerobic bacteria in the collection tank 13 allows preliminary digestion or organic waste matter to occur. The secondary tank 15 is sized to accommodate overflows that occur during peak periods. The high liquid level resulting from these peak periods will then be worked down as the liquid is processed out of the secondary tank 15 at a relatively constant rate over a 24-hour period into the digester basin 20.

The first basin 20 is configured to contain a significant volume of wastewater and to receive a rotating biological digester 24 for aerobic bacterial treatment of the wastewater. The digester 24 is mounted partially within the basin 20. Preferably, between 30% to 50% of the diameter of the digester is immersed in the effluent contained in the basin 20. More preferably, 40% of the diameter of the digester is immersed in the effluent contained in basin 20.

The biological digester 24 used in this embodiment of the invention is preferably a generally cylindrical, cage-like enclosure, as described in more detail below, adapted for receiving a plurality of bacteria-hosting media. Alternatively, though less preferred, the digester 24 may contain an enclosure on a central shaft or with stub shafts, for example. See e.g., U.S. Pat. No. 4,137,172 to Sako and U.S. Pat. No. 5,350,507 to McManus. Even less preferred is the use of conventional sheet or plate rotating contactors on a central shaft.

In this embodiment, as shown in FIGS. 1A and 3, the digester 24 is rotated by two drive chains 32, attached to a bearing 42 and axle 30 system, which is driven by a motor 26 and gear box 28. Although the bearing and axle may be made of many suitable materials, ultra high molecular weight polyethylene is preferred. Other arrangements for driving the digester may also be used.

FIG. 5A shows a preferred embodiment of a rotating biological digester 24 that may be used in the unit 10 of the present invention. The digester 24 includes two circular end disks 52 connected along their peripheries by a plurality of rods 60, sprockets 68 with teeth 74, and end caps 72. Although other materials may be suitable, preferably these components are made of a reinforced plastic such as fiberglass.

The end disk 52 of the digester 24 is supported by a bearing 58, as shown in FIG. 4A. Although a pair of bearings 58 is the preferred means of supporting the digester 24, alternatively, a center shaft, end stub shafts, or other means of support may be used. The bearing used in the embodiment shown in FIG. 4A is further illustrated in FIGS. 6 and 8.

FIG. 6 shows the cross-sectional detail of the end disk 52 of the digester 24 supported by bearing 58. The bearing 58 may be anchored to the wall 16 of the unit 10 by bolts 64, preferably made of stainless steel. A rod 60 extends through the end disk 52 and through a sprocket section 68, which is illustrated in further detail in FIG. 7. The end disk 52 and sprocket section 68 are separated by a spacer 70. The sprocket 68 is held in place by an end cap 72. A drive chain 32, preferably made of stainless steel, is attached to the sprocket 68 which has a plurality of teeth 74, as shown in FIG. 7. The drive chain 32 catches every other tooth 74 of the sprocket 68. As shown in FIGS. 6 and 8, the bearing includes an upper surface for supporting the end wall 52 of the digester basket, and a lower bearing surface acting as a chain guide.

Preferably, the rotating digester 24 contains a plurality of bacteria hosting media, which have a relatively large surface area per unit of occupied bulk volume. Examples of media that may be used in the digester 24 include the media disclosed in U.S. Pat. No. 5,401,398 to McManus, U.S. Pat. No. 3,540,589 to Boris, and U.S. Pat. No. 3,914,351 to McKeown et al., and disclosed in U.S. Pat. No. 6,852,227 which are hereby incorporated herein by reference. The media disclosed in the latter application is most preferred.

Figure 10:
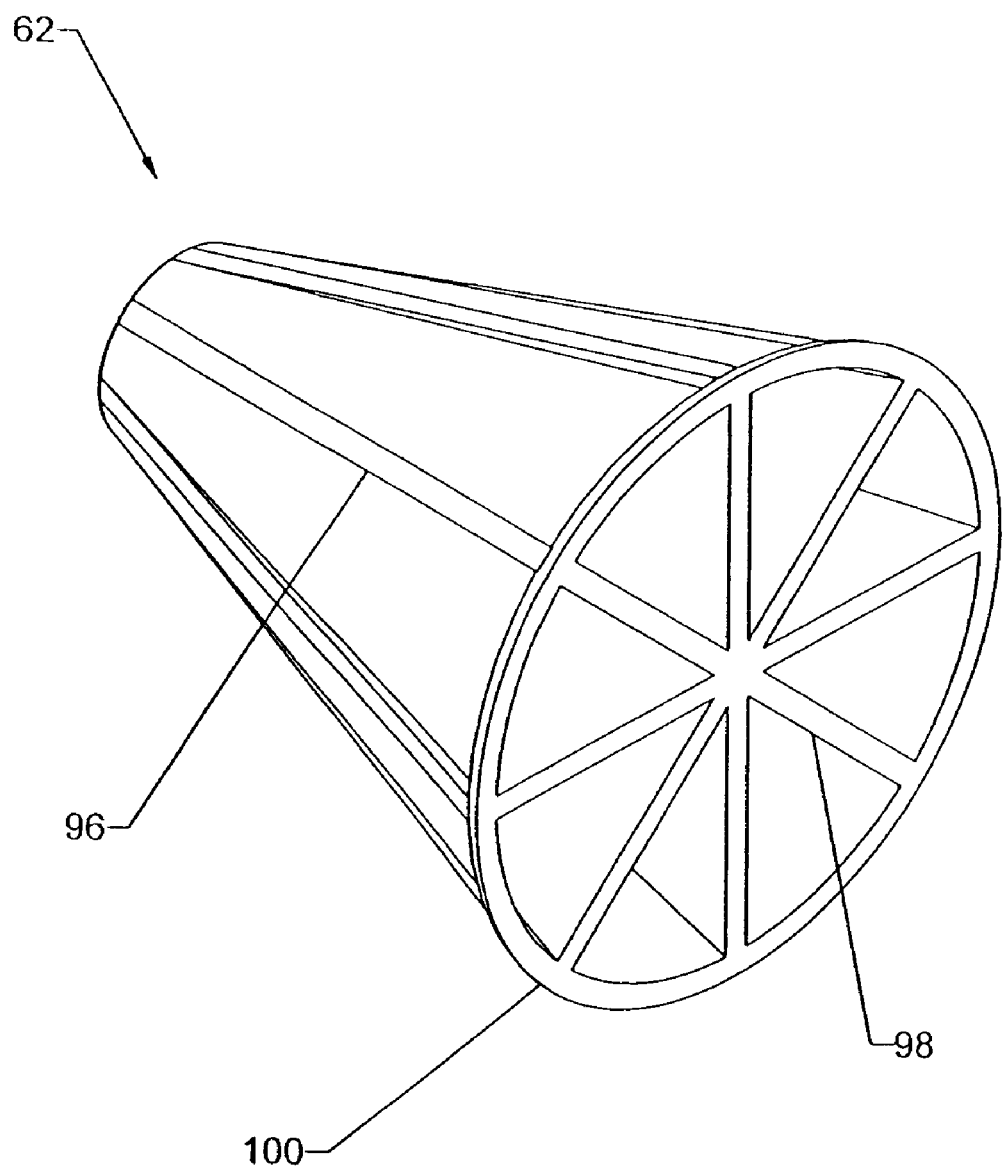
FIG. 10 is a perspective view of one embodiment of a media member that may be used in the apparatus of the present invention.

FIG. 10 is a perspective view of one embodiment of a media member 62 disclosed in the co-pending application to Petrone. The media member 62 has a truncated conical shape with internal ribs 98, external ribs 96, and an optional rim 100. This type of media allows for adequate flushing of dead bacteria through the media members 62 so that it can be transported to the clarifier 22, where it settles to the bottom 34. Moreover, the shape and dimensions of this media promote adequate tumbling action and contact with the effluent to ensure efficient system performance.

Preferably, the bulk volume of the media occupies about 45% to 95% by volume of the space in the digester enclosure, and more preferably, about 80% by volume of the enclosure. Also, the preferable rate of rotation of the enclosure is about 1 revolution per minute (rpm) to 3 rpm, and more preferably 1.5 rpm.

As shown in FIGS. 2, 3 and 4A, the second basin 22 is configured to operate as a clarifying unit. In this embodiment, the clarifying unit 22 has a partial, truncated conical shape with a flat side 48. Preferably, the angle of the side wall of the clarifying unit 22 is less than 30°. Alternatively, other types of clarifiers may be used, such as truncated conical clarifiers (see e.g., U.S. Pat. No. 4,650,577 to Hansel), clarifiers having inclined flow passages (see e.g., U.S. Pat. No. 4,089,782 to Huebner), and integral clarifiers (see e.g., U.S. Pat. No. 6,572,774 to Ricketts), which patents are hereby incorporated herein by reference. The size and shape of the clarifier basin 22 provides low turbulence and low flow conditions so that any solids remaining in the effluent stream received from the digester basin 20 can settle to the bottom 34 of the clarifier basin.

FIGS. 4A and 4B show a disinfector basin 56 containing two ultraviolet bulbs 54, separated by a baffle 92. The ultraviolet light destroys any remaining microscopic organisms in the effluent stream. Alternatively, a one-bulb disinfector or a chlorination unit may be used. In the embodiment shown in FIGS. 4A and 4B, the housing for the disinfector 56 is a rectangular chamber that may be molded into the top 18 of the tank 12. Alternatively, the disinfector bulbs may be housed in a large pipe, for example.

The top of the unit 10 shown in FIGS. 1–4AB also includes spillways 40, 44 and 50, and a weir plate 38. A first spillway 44 transports effluent from the digester basin 20 to the clarifier basin 22. A second spillway 40 transports the effluent from the clarifier basin 22 to a disinfecting basin 56 (shown in FIGS. 4A and 4B). A third spillway 50 transports the effluent from the disinfecting basin 56 to a sump tank 36. The sump tank may contain a float-activated pump that distributes the cleansed effluent for above ground discharge.

In this preferred embodiment, the tank 12, the digester basin 20, clarifier basin 22 and disinfecting basin 56 are integrally molded into a monolithic one-piece unit 10. Optionally, the disinfecting basin 56 may be replaced with alternative disinfecting means external to the monolithic unit 10. Conventional roto-molding techniques may be used to manufacture a monolithic enclosed tank as shown in these figures. Alternatively, one skilled in the art will understand that the tank and other elements of the system may be fashioned from several pieces that are assembled into a single unit. Although other materials may be suitable, preferably, the unit is made of polyethylene.

In normal operation, wastewater from a household flows into the collection tank 14. The overflow over the baffle 46 spills into the secondary tank 15. The effluent in the secondary tank 15 is pumped into the digester basin 20. The digester 24 rotates into and out of the digester basin 20, which thereby exposes the effluent to the aerobic bacteria residing on the media contained inside the digester 24. These bacteria digest additional impurities in the effluent. Next, the overflow effluent flows through the first spillway 44 to clarifier basin 22, where solids remaining in the effluent settle to the bottom 34. The overflow liquid then flows through the second spillway 40 into the disinfector 56, where any remaining living organisms are destroyed. Finally, the liquid flows through the third spillway 50 to tank 36. The liquid may then be subjected to a sand filtration unit (not shown) or released for above-ground discharge by gravity flow or a pumping unit.

In addition to the household wastewater fed into the collection tank 13, sediment or slough from the clarifier basin 22 may be periodically pumped to the collection tank. Preferably, a submersible sump pump is located in the clarifier basin 22 for this service. This periodic discharge causes a stirring action in the collection tank 13, and allows the anaerobic bacteria to continue with the primary digestion stage. After the effluent passes over the baffle 46 and into the secondary tank 15, the anaerobic bacteria continue to break down the suspended solids. Preferably, in a low wastewater flow situation, liquid contained within the system may be re-circulated to allow for continuous system operation.

A programmable logic controller (PLC) may be used with the system of the present invention to continuously monitor and control system variables. Pumps, level controllers, diagnostic equipment, and other sensors may be tied into the controller. The controller may also be used to detect a low-flow situation and make an appropriate adjustment in flow, such as internal recirculation of effluent. Likewise, the controller may be programmed to trigger an indicator inside a home when a drive chain used to rotate the digester breaks or when an ultraviolet bulb used in the disinfector burns out. The controller may be provided with a wireless communication system to send a diagnostic message to a remote service center when maintenance is needed.

One embodiment of the packaged unit 10 of the present invention has an operational capacity of about 300 to 700 gallons of effluent per day, which is suitable for a single household use. Preferably, the unit has an operational capacity of at least 350 gallons per day, and more preferably, of about 400 to 600 gallons per day. The tank 12 has a volume of between about 100 cubic feet and 300 cubic feet. Preferably, the tank 12 has a volume of less than about 250 cubic feet, and more preferably, of about 160 cubic feet.

Although many variations in the dimensions are contemplated for the packaged unit 10, the following dimensions are preferred to meet the above-noted capacity: tank exterior—4 feet wide by 8 feet long by 5 feet high; digester basket —3 feet in diameter by 3 feet long; basin which houses biological digester —3 feet wide by 3 feet long by 1.5 feet deep; disinfector housing—8 inches by 4 inches by 22 inches (6–7 gallon capacity); collecting tank—550 gallon capacity; and secondary tank—450 gallon capacity.

Figure 9:
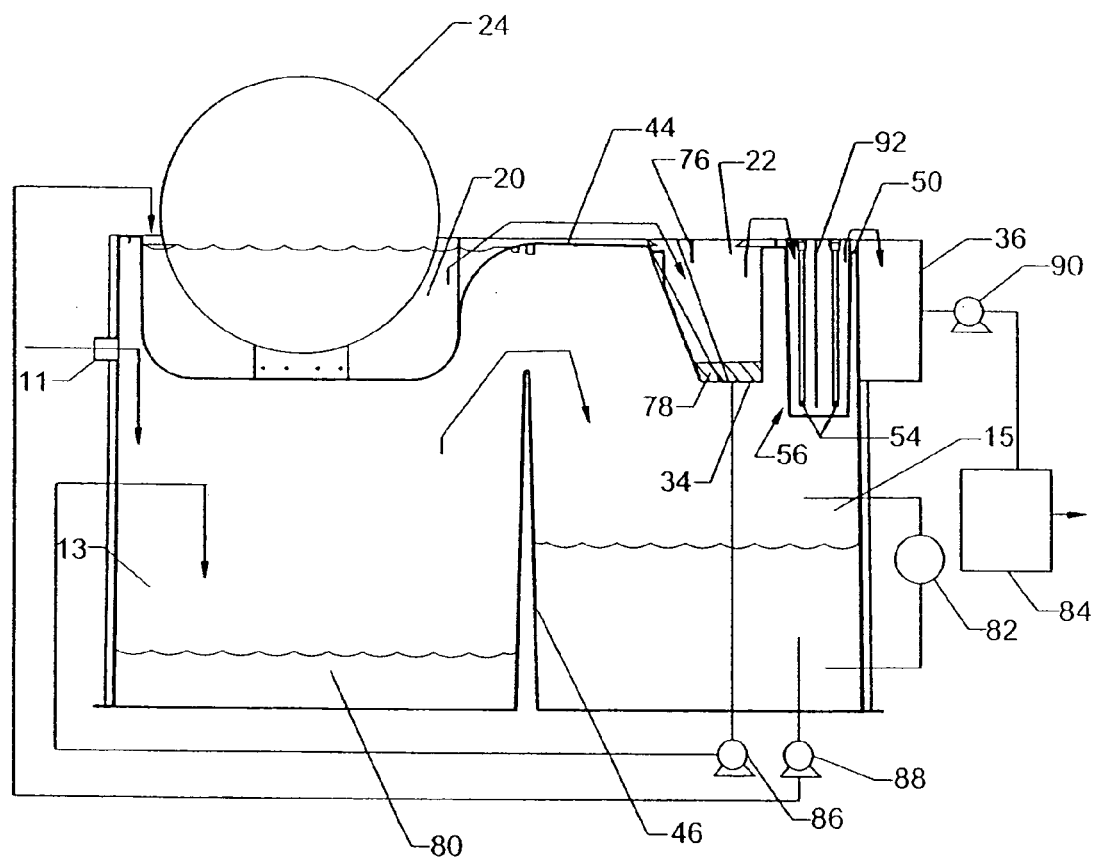
FIG. 9 is a schematic diagram of the process flow through one embodiment of the apparatus of the present invention.

FIG. 9 is a process flow schematic that illustrates a preferred embodiment of the method of the present invention. The effluent stream to be treated enters the collection tank 13 through inlet port 11. The inlet port may be, for example, a standard four-inch line directly from a house. Sediment 80 remains in the collection tank 13, while the remaining liquid moves over the baffle 46 and into the secondary tank 15. Based on the reading of level indicator 82, pump 88 transports a precise amount of liquid into basin 20. The digester 24 then rotates into and out of the liquid, allowing the aerobic bacteria attached to the media within the digester 24 to perform their cleansing function. At the end of their life cycle, the aerobic bacteria die and their carcasses drop into the liquid and are carried with the liquid into the clarifier 22 by means of spillway 44.

In the clarifier 22, any remaining solids present in the effluent, including the bacteria carcasses, settle to the bottom 34 of the clarifier 22, where a computer-controlled sump pump 86 periodically transports the settled solids 78 to collecting tank 13 to be cycled back through the entire system. Preferably, pumps 86 and 88 are submersible. After the effluent enters clarifier 22, it is forced under baffle 76 and then is transported to disinfector 56 by means of spillway 40. The effluent leaves the disinfector 56 by means of spillway 50 and enters tank 36.

From tank 36, the liquid may be transported to an optional sand filtration unit 84 by means of pump 90. The resulting stream may be discharged to the atmosphere. Alternatively, the output of tank 36 may be discharged directly to the atmosphere by gravity flow or a pump.

It is therefore intended that the foregoing detailed description be regarded as illustrative rather than limiting, and that it be understood that it is the following claims, including all equivalents, that are intended to define the spirit and scope of this invention.

What is claimed is:

1. A wastewater treatment system comprising:
   a tank having a bottom, side walls, and a top defining an interior of the tank, the top having a first and second basin integrally molded therein, the first basin being in fluid communication with the second basin;
   an inlet in fluid communication with the interior of the tank;
   means for transporting wastewater from the tank to the first basin;
   a generally cylindrical enclosure adapted for containing a plurality of bacteria-hosting media, the enclosure rotatably mounted partially within the first basin; and
   means for destroying microscopic organisms in a stream of effluent from the second basin.

2. The system of claim 1 wherein the tank, the first basin, and the second basin comprise an integrally molded, one-piece unit.

3. The system of claim 2 wherein the tank further comprises a vertical baffle upstanding from the bottom of the tank separating the tank into a first compartment and a second compartment.

4. The system of claim 3 wherein the baffle is integrally molded with the bottom of the tank.

5. The system of claim 1 wherein the enclosure is rotated by a motor and drive chain.

6. The system of claim 1 further comprising means for supporting the enclosure.

7. The system of claim 6 wherein the means for supporting the enclosure comprises at least two bearing guides.

8. The system of claim 1 wherein the second basin comprises a truncated conical shape with a flat side.

9. The system of claim 1 wherein the means for destroying microscopic organisms comprises an ultraviolet disinfector or chlorination injector.

10. The system of claim 1 wherein the means for destroying microscopic organisms is housed in a third basin integrally molded in the top of the tank.

11. The system of claim 10 further comprising a first open channel in communication between the first basin and the second basin, a second open channel in communication between the second basin and the third basin, and a third channel in communication between the third basin and an effluent port.

12. The system of claim 11 further comprising a second tank in communication with the third channel.

13. The system of claim 1 wherein the cylindrical enclosure comprises a pair of circular end disks and a plurality of rods connecting the perimeters of the end disks.

14. The system of claim 1 further comprising a sump pump that periodically removes sediment from the second basin.

15. The system of claim 1 further comprising a cover disposed over the top of the tank and the generally cylindrical enclosure.

16. The system of claim 1 wherein the system has an operational capacity of at least about 350 gallons of effluent per day and the tank has a volume of less than about 250 cubic feet.

17. A method for treating wastewater comprising the steps of:
   providing an integrally molded monolithic enclosure having an interior and a top, the interior being adapted to form a collection tank and the top being molded to form a basin and a clarifying chamber;
   feeding the wastewater to the collection tank to obtain a liquid first effluent;
   transporting the liquid first effluent to the basin having a biological digester mounted therein to obtain a second effluent, the biological digester containing a plurality of bacteria-hosting media;
   transporting the second effluent to the clarifying chamber to obtain a third effluent, wherein the clarifying chamber comprises means for separating contaminants from a stream of wastewater; and
   transporting the third effluent to a disinfector to obtain a fourth effluent, wherein the disinfector comprises means for destroying microscopic organisms.

18. The method of claim 17 further comprising transporting the fourth effluent to a sand filtration unit.

19. A wastewater treatment system comprising:
   a tank having a bottom, side walls, an open top and a vertical baffle upstanding from the bottom of the tank separating the tank into a first compartment and a second compartment;
   an inlet in fluid communication with the first compartment of the tank;
   a lid disposed over and sealing the tank, the lid having a first basin, a second basin, a third basin, a first open channel in communication between the first and second basin, a second open channel in communication with the second basin and the third basin, and a third channel in communication with the third basin and an effluent port, the first basin being disposed over the first compartment of the tank and the second and third basins disposed over the second compartment of the tank;
   means for transporting wastewater from the second compartment to the first basin;
   a cylindrical basket having an axis of rotation disposed above the first basin such that a major portion of the basket is above the first basin and a minor portion is within the first basin, the cylindrical basket comprising a pair of circular end disks and a plurality of rods aligned parallel to the axis of rotation and connected to the perimeter of the end disks;
   a pair of support bearings disposed in the first basin, each support bearing supporting an end disk of the cylindrical basket;
   an ultraviolet disinfector positioned within the third basin;
   a sump tank connected to the tank in communication with the third channel;
   drive means for rotating the cylindrical basket; and
   a recirculating pump for withdrawing liquid from the second basin and pumping into the first compartment of the tank.

\* \* \* \* \*